(12) United States Patent
    Dou

(10) Patent No.: US 11,989,374 B2
(45) Date of Patent: May 21, 2024

(54) DETECTION METHOD, DEVICE, AND ELECTRONIC EQUIPMENT

(71) Applicant: Chipone Technology (Beijing) Co., LTD., Beijing (CN)

(72) Inventor: Yuntao Dou, Beijing (CN)

(73) Assignee: Chipone Technology (Beijing) Co., LTD., Beijing (CN)

( * ) Notice: Subject to any disclaimer, the term of this patent is extended or adjusted under 35 U.S.C. 154(b) by 85 days.

(21) Appl. No.: 17/832,119

(22) Filed: Jun. 3, 2022

(65) Prior Publication Data

US 2022/0300141 A1    Sep. 22, 2022

Related U.S. Application Data

(63) Continuation of application No. PCT/CN2020/133626, filed on Dec. 3, 2020.

(30) Foreign Application Priority Data

Dec. 5, 2019    (CN) .......................... 201911236185.5

(51) Int. Cl.
    *G06F 3/0354*    (2013.01)
    *G06F 3/041*    (2006.01)
    (Continued)

(52) U.S. Cl.
    CPC ...... *G06F 3/04186* (2019.05); *G06F 3/03547* (2013.01); *G06F 3/04182* (2019.05);
    (Continued)

(58) Field of Classification Search
    CPC .. G06F 3/03547; G06F 3/0412; G06F 3/0418; G06F 3/04182; G06F 3/04186;
    (Continued)

(56) References Cited

U.S. PATENT DOCUMENTS

| 2013/0207935 A1 | 8/2013 | Toda et al. |
| 2018/0150183 A1 | 5/2018 | Putra et al. |
| 2018/0275825 A1 | 9/2018 | Drake |

FOREIGN PATENT DOCUMENTS

| CN | 102968217 | 3/2013 |
| CN | 103970357 | 8/2014 |

(Continued)

OTHER PUBLICATIONS

PCT International Search Report and Written Opinion in International Appln. No. PCT/CN2020/133626, dated Feb. 25, 2022, 16 pages (With English Translation).

(Continued)

*Primary Examiner* — Julie Anne Watko
(74) *Attorney, Agent, or Firm* — Fish & Richardson P.C.

(57) ABSTRACT

The present disclosure relates to detection methods, devices and electronic equipment. An example method includes determining a first detection channel of a triggered touch control area when a touch control display device is triggered; determining whether the touch control area is covered by liquid according to a characteristic value of a first detection channel based on responsive to determining a sum of characteristic values of adjacent detection channels is greater than or equal to a third preset value, determining that the touch control area is covered by liquid, wherein a second preset value is greater than a first preset value and less than the third preset value; and not responding to a touch control signal of the touch control area collected at a current time under the condition of determining that the touch control area is covered by liquid.

11 Claims, 8 Drawing Sheets

(51) Int. Cl.
  *G06F 3/044* (2006.01)
  *G06F 3/0488* (2022.01)
  *G09G 3/3208* (2016.01)
  *G09G 3/36* (2006.01)

(52) U.S. Cl.
  CPC .......... *G06F 3/0448* (2019.05); *G06F 3/0488* (2013.01); *G06F 3/0412* (2013.01); *G09G 3/3208* (2013.01); *G09G 3/36* (2013.01)

(58) Field of Classification Search
  CPC ...... G06F 3/044; G06F 3/0448; G06F 3/0488; G09G 3/3208; G09G 3/36
  See application file for complete search history.

(56) References Cited

FOREIGN PATENT DOCUMENTS

| | | |
|---|---|---|
| CN | 104679373 | 6/2015 |
| CN | 104699545 | 6/2015 |
| CN | 105683886 | 6/2016 |
| CN | 106990860 | 7/2017 |
| CN | 107045401 | 8/2017 |
| CN | 108235747 | 6/2018 |
| CN | 108710453 | 10/2018 |
| CN | 108762557 | 11/2018 |
| CN | 111078046 | 4/2020 |
| WO | 2019014822 | 1/2019 |
| WO | 2021110098 | 6/2021 |

OTHER PUBLICATIONS

Office Action in Chinese Appln. No. 201911236185.5, dated Apr. 21, 2021, 15 pages (with English translation).

| No. | Ch:01 | Ch:02 | Ch:03 | Ch:04 | Ch:05 | Ch:06 | Ch:07 | Ch:08 | Ch:09 | Ch:10 | Ch:11 | Ch:12 | Ch:13 | Ch:14 | Ch:15 | Ch:16 |
|---|---|---|---|---|---|---|---|---|---|---|---|---|---|---|---|---|
| Diff | 410 | 1262 | 8981 | 13880 | 15623 | 4455 | 192 | 30 | -167 | 262 | 10402 | 25139 | 3172 | 594 | -101 | -237 |

| No. | Ch:17 | Ch:18 | Ch:19 | Ch:20 | Ch:21 | Ch:22 | Ch:23 | Ch:24 | Ch:25 | Ch:26 | Ch:27 | Ch:28 | Ch:29 | Ch:30 | Ch:31 | Ch:32 |
|---|---|---|---|---|---|---|---|---|---|---|---|---|---|---|---|---|
| Diff | 18 | 1293 | 7280 | 10864 | 11753 | 4572 | 541 | -37 | -451 | -13 | 6865 | 32440 | 7551 | 627 | 46 | -37 |

DETECTION METHOD, DEVICE, AND ELECTRONIC EQUIPMENT

CROSS-REFERENCE TO RELATED APPLICATION

This application is a continuation of and claim priority under 35 U.S.C. § 120 to PCT Application. No. PCT/CN2020/133626, filed on Dec. 3, 2020, which is based upon and claims priority of Chinese Patent Application entitled "Detection Method And Apparatus, And Electronic Device" filed on Dec. 5, 2019, with the Application No. 201911236185.5. All the above referenced priority documents are hereby incorporated by reference in their entireties.

TECHNICAL FIELD

The present disclosure relates to the field of detection technology, and more particularly to a detection method, device, and electronic equipment.

BACKGROUND

Touch screens are increasingly used in electronic equipment due to their convenience and use characteristics. Self-capacitance touch screens are widely used in the touch screens. However, due to the physical characteristics of self-capacitance touch screens, in a case where water drops on the touch screen, there is no adverse effect when touching other areas which are dry, while a change in the sensed amount much larger than usual would be caused when touching a water-covered area. This results in severe distortion of the detected touch point information.

SUMMARY

In view of this, the present disclosure proposes a detection method, wherein the method comprises: determining a first detection channel of a triggered touch control area when a touch control display device is triggered, wherein the touch control display device includes a plurality of detection channels including the first detection channel for obtaining characteristic values based on a touch action, the characteristic value of the first detection channel is greater than a first preset value, and the characteristic value of the first detection channel is a maximum value of the characteristic values of the plurality of detection channels; determining whether the touch control area is covered by liquid based on the characteristic value of the first detection channel; and responsive to determining that the touch control area is covered by liquid for a current time, not responding to a touch control signal of the touch control area collected for the current time.

In a possible embodiment, determining whether the touch control area is covered by liquid based on the characteristic value of the first detection channel comprises: determining a sum of the characteristic values of a plurality of adjacent detection channels to the first detection channel when the characteristic value of the first detection channel is greater than or equal to a second preset value; responsive to determining that the sum of the characteristic values is greater than or equal to a third preset value, determining that the touch control area is covered by liquid; wherein the second preset value is greater than the first preset value and less than the third preset value.

In a possible embodiment, determining whether the touch control area is covered by liquid based on the first detection channel comprises: responsive to the characteristic value of the first detection channel is less than the second preset value, determining a first number of second detection channels in the detection channel of the touch control area, wherein the characteristic value of the second detection channel is greater than the first preset value; determining a second number of detection channels having a characteristic value greater than a fourth preset value among the plurality of adjacent detection channels to first detection channel, the fourth preset value being greater than the first preset value; responsive to the first number is greater than or equal to a first number threshold value and the second number is greater than or equal to a second number threshold value, determining that the touch control area is covered by liquid.

In a possible embodiment, the method further comprises: responsive to determining that the touch control area is covered by liquid, determining whether the touch control area is covered by liquid for continuous N times, and responsive to determining that the touch control area is not covered by liquid for an $i^{th}$ time, not responding to the touch control signal of the touch control area acquired for the $i^{th}$ time, wherein $1 \leq i \leq N-1$, and i and N are integers; responsive to determining that the touch control area is not covered by liquid for an $N^{th}$ time, acquiring the touch control signal of the touch control area collected for the $N^{th}$ time.

In a possible embodiment, the detection channels comprise triangular sensors.

According to another aspect of the present disclosure, a detection device is provided, wherein the device comprises: a first module configured for determining a first detection channel of a triggered touch control area when a touch control display device is triggered, wherein the touch control display device includes a plurality of detection channels including the first detection channel for obtaining characteristic values based on a touch action, the characteristic value of the first detection channel is greater than a first preset value, and the characteristic value of the first detection channel is a maximum value of the characteristic values of the plurality of detection channels; a second module connected to the first module and configured for determining whether the touch control area is covered by liquid based on the characteristic value of the first detection channel; and a third module connected to the second module and configured for, responsive to determining that the touch control area is covered by liquid for a current time, not responding to a touch control signal of the touch control area collected for the current time.

In a possible embodiment, determining whether the touch control area is covered by liquid based on the characteristic value of the first detection channel comprises: determining a sum of the characteristic values of a plurality of adjacent detection channels to the first detection channel when the characteristic value of the first detection channel is greater than or equal to a second preset value; responsive to determining that the sum of the characteristic values is greater than or equal to a third preset value, determining that the touch control area is covered by liquid; wherein the second preset value is greater than the first preset value and less than the third preset value.

In a possible embodiment, determining whether the touch control area is covered by liquid based on the first detection channel comprises: responsive to the characteristic value of the first detection channel is less than the second preset value, determining a first number of second detection channels in the detection channel of the touch control area, wherein the characteristic value of the second detection channel is greater than the first preset value; determining a second number of detection channels having a characteristic value greater than a fourth preset value among the plurality of adjacent detection channels to the first detection channel, the fourth preset value being greater than the first preset value; responsive to the first number is greater than or equal to a first number threshold value and the second number is greater than or equal to a second number threshold value, determining that the touch control area is covered by liquid.

In a possible embodiment, the device further comprises: a fourth module connected to the second module and configured for, responsive to determining that the touch control area is covered by liquid, determining whether the touch control area is covered by liquid for continuous N times, and responsive to determining that the touch control area is not covered by liquid for an $i^{th}$ time, not responding to the touch control signal of the touch control area acquired for the $i^{th}$ time, wherein $1 \leq i \leq N-1$, and i and N are integers; wherein the third module is further configured for, responsive to determining that the touch control area is not covered by liquid for a $N^{th}$ time, acquiring the touch control signal of the touch control area collected for the $N^{th}$ time.

According to another aspect of the present disclosure, an electronic equipment is provided, including the detection device and a display panel.

In a possible embodiment, the electronic equipment includes a display component, the first module being arranged above, below or within the display component.

In a possible embodiment, the display component includes at least one of a liquid crystal display component, a light emitting diode display component, an organic light emitting diode display component, and a micro light emitting diode display component.

In a possible embodiment, the micro light emitting diode display component includes a Mini LED or a Micro LED.

Various aspects of embodiments of the present disclosure may determine a first detection channel of a triggered touch control area when a touch control display device is triggered, determine whether the touch control area is covered by liquid according to a characteristic value of a first detection channel, and not respond to a touch control signal of the touch control area collected at a current time under the condition of determining that the touch control area is covered by liquid. The present disclosure can quickly and accurately determine whether the triggered touch control area is covered by liquid, so as to avoid collecting a distorted and erroneous touch control signal. The detection method and device of the embodiments of the present disclosure are relatively simple and have low operation cost.

Other features and aspects of the present disclosure will become apparent from the following detailed description of exemplary embodiments with reference to the accompanying drawings.

BRIEF DESCRIPTION OF THE DRAWINGS

The accompanying drawings, which are incorporated in and constitute a part of this description, illustrate exemplary embodiments, features and aspects of the disclosure and, together with the description, serve to explain the principles of the disclosure.

DETAILED DESCRIPTION

Various exemplary embodiments, features and aspects of the disclosure will be described in detail below with reference to the accompanying drawings. The same reference numbers will be used throughout the drawings to refer to the same or like parts. While the various aspects of the embodiments are shown in the drawings, the drawings are not necessarily drawn to scale unless specifically indicated.

The word "exemplary" is used exclusively herein to mean "serving as an example, instance, or illustration". Any embodiment described herein as "exemplary" is not necessarily to be construed as preferred or advantageous over other embodiments.

In addition, in the following detailed description, numerous specific details are set forth in order to provide a thorough understanding of the present disclosure. It will be understood by those skilled in the art that the present disclosure may be practiced without some of these specific details. In some instances, methods, means, elements and circuits well known to those skilled in the art have not been described in detail so as not to obscure the present disclosure.

Figure 1:
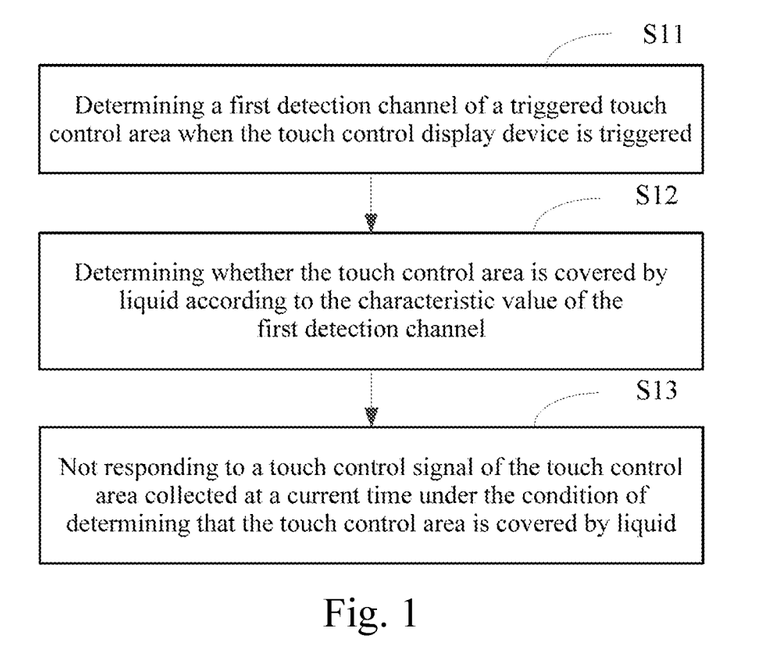
FIG. 1 shows a flow chart of a detection method according to an embodiment of the present disclosure.

Referring to FIG. 1, it shows a flow chart of a detection method according to an embodiment of the present disclosure.

As shown in FIG. 1, the method includes:

Step S11, determining a first detection channel of a triggered touch control area when a touch control display device is triggered, wherein the touch control display device includes a plurality of detection channels used for obtaining characteristic values according to a touch action, the characteristic value of the first detection channel is greater than a first preset value, and the characteristic value of the first detection channel is a maximum value of the characteristic values of the plurality of detection channels;

Step S12, determining whether the touch control area is covered by liquid according to the characteristic value of the first detection channel; and Step S13, not responding to a touch control signal of the touch control area collected at a current time under the condition of determining that the touch control area is covered by liquid.

With the above method, the embodiments of the present disclosure may determine a first detection channel of a triggered touch control area when a touch control display device is triggered; determining whether the touch control area is covered by liquid according to a characteristic value of a first detection channel; and not responding to a touch control signal of the touch control area collected at a current time under the condition of determining that the touch control area is covered by liquid. The detection method proposed in the embodiments of the present disclosure can quickly and accurately determine whether the triggered touch control area is covered by liquid, so as to avoid collecting a distorted and erroneous touch control signal. The detection method of the embodiments of the present disclosure is relatively simple and has low operation cost.

In an example, not responding to the touch control signal of the touch control area collected at the current time may, for example, include abandoning the touch control signal of the touch control area collected at the current time, or not reporting the touch control signal of the touch control area collected at the current time.

In a possible implementation, the touch control display device where a plurality of touch sensors may be provided may include a touch display screen (e.g. a self-capacitance touch display screen).

The touch control display device may be provided in the electronic equipment, which may also be referred to as mobile equipment, which may refer to various forms of access mobile equipment, user units, user equipment, user stations, mobile stations, Mobile Station (MS), remote stations, remote mobile equipment, mobile equipment, user mobile equipment, terminal equipment, wireless communication equipment, user agents, or user device. The user equipment may also be a cellular phone, a cordless phone, a Session Initiation Protocol (SIP) phone, a Wireless Local Loop (WLL) station, a Personal Digital Assistant (PDA), a handheld device having wireless communication capabilities, a computing device or other processing device connected to a wireless modem, an in-vehicle device, a wearable device, a user device in a future 5G network or mobile equipment in a future evolved Public Land Mobile Network (PLMN), etc. which is not limited in embodiments of the present disclosure.

Figure 2A:
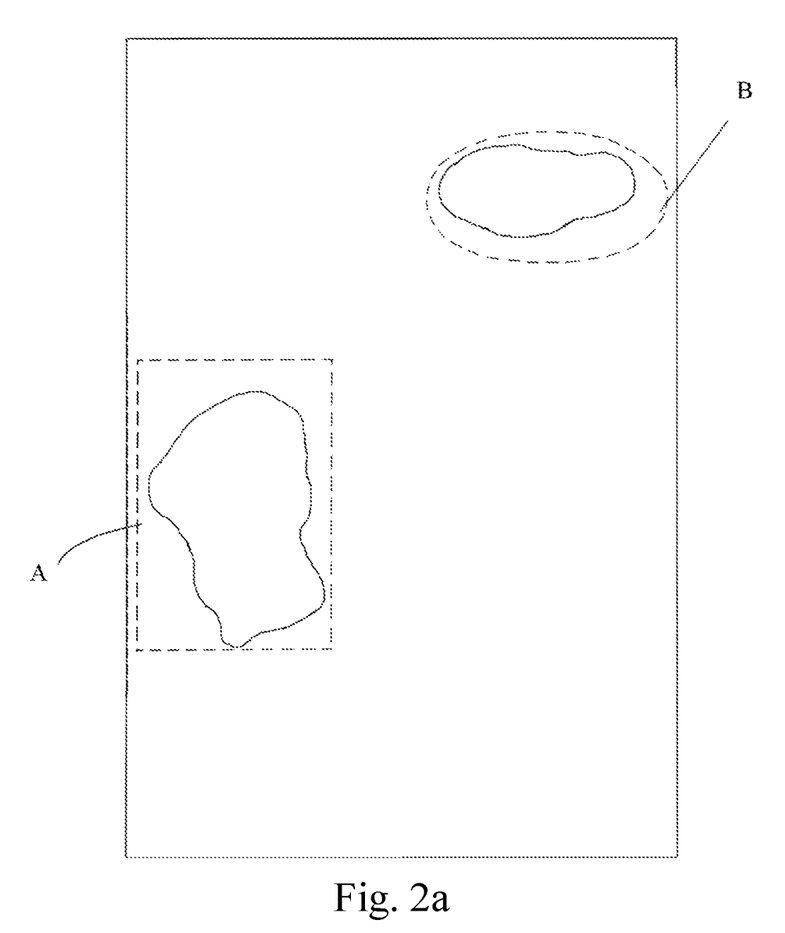
FIG. 2a shows a schematic diagram of a touch control display device covered by liquid.
Figure 2B:
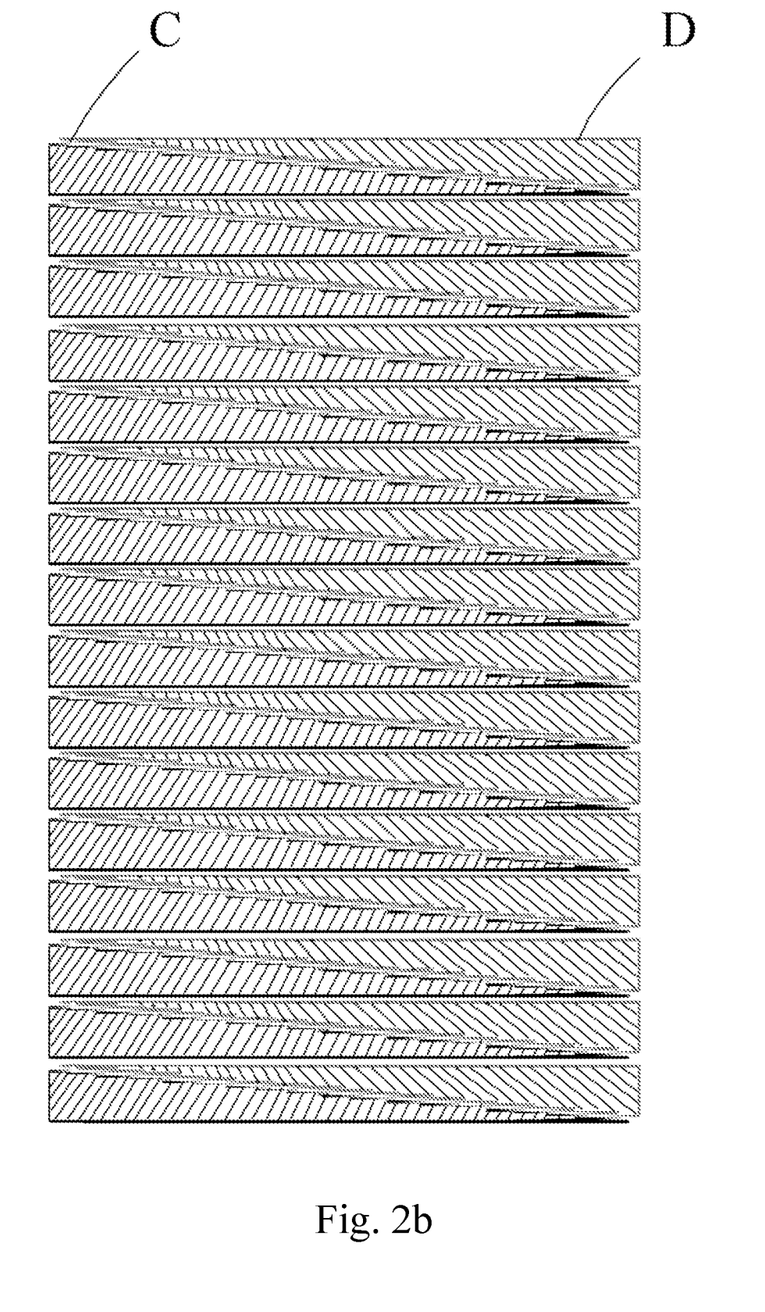
FIG. 2b shows a schematic view of a sensor provided in the touch control display device.
Figure 2C:
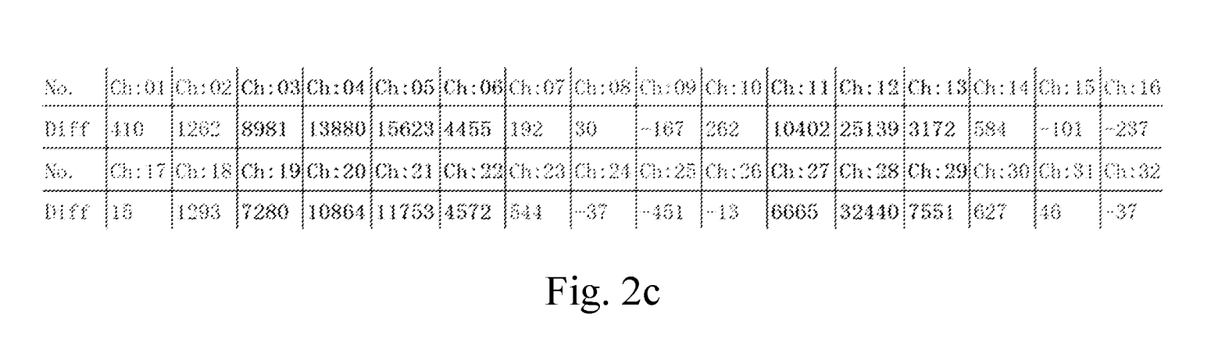
FIG. 2c shows a schematic view of each detection channel and corresponding characteristic values in the touch control display device.

Referring to FIG. 2a, FIG. 2b, and FIG. 2c, FIG. 2a shows a schematic diagram of a touch control display device covered by liquid, FIG. 2b shows a schematic view of a sensor provided in the touch control display device, and FIG. 2c shows a schematic view of each detection channel and corresponding characteristic values in the touch control display device.

As shown in FIG. 2b, a plurality of triangular sensors may be provided in the touch control display device, each detection channel may include at least one triangular sensor, and each triangular sensor C and each triangular sensor D may be regarded as one sensor group or referred to as one detection channel group.

In an example, the triangular sensor may be a self-capacitance type.

As shown in FIG. 2c, for example, the touch control display device may include 32 detection channels (Ch01-Ch32), wherein the detection channel Ch01 and the detection channel Ch17 may be regarded as one sensor group (e.g., it may be a triangular sensor C and a triangular sensor D as shown in FIG. 2b), the detection channel Ch02 and the detection channel Ch18 may be regarded as one sensor group, . . . , and the detection channel Ch16 and the detection channel Ch32 may be regarded as one sensor group.

Of course, it should be understood that the above description is exemplary, that the sensors provided in the touch control display device may have other forms, and that the types of the sensors may be other, and the present disclosure is not limited thereto.

When a finger, a touch pen or the like touches a touch control area of a touch control display device, a detection channel in the touched touch control area may obtain a corresponding characteristic value. In an example, the characteristic value obtained by the detection channel according to a touch action may be obtained by differencing a detected sensing value and a reference value. For example, the reference value of each detection channel may be set in advance; and when the touch control area is triggered to obtain the sensing value of each detection channel, the detected sensing value and the reference value may be differenced to obtain the characteristic value.

Of course, the above description is exemplary. The present disclosure is not limited to the specific manner of obtaining the characteristic value, and the reference value (including size and unit) of each detection channel is not limited. A person skilled in the art can set the reference value according to needs and select a method for obtaining the characteristic value according to needs.

As shown in FIG. 2c, since the difference of each detection channel and the situation when it is triggered are different, there are differences in the characteristic values detected by each detection channel; when a detection channel is covered by liquid (as shown in A and B in FIG. 2a), the characteristic values detected by the detection channel are significantly greater than the characteristic values obtained by a detection channel which is not covered by liquid; for example, in FIG. 2c, the characteristic values of the detection channels Ch03-Ch06, Ch19-Ch22, Ch11-Ch13 and Ch27-Ch29 are greater than the characteristic values of the other detection channels; therefore, the detection channels Ch03-Ch06, Ch19-Ch22, Ch11-Ch13, and Ch27-Ch29 are detection channels that may be covered by liquid.

Of course, the manner of determining whether the touch control display device is covered by liquid includes various manners. For example, in FIG. 2a, the term of covered by liquid includes a case A and a case B. Therefore, at least two methods can be included in determining whether the touch control display device is covered by liquid, which will be exemplified below.

For the case B, when the number of detection channels covered by liquid is small to cover a certain sensor group,
  in a possible embodiment, the step S12 of determining whether the touch control area is covered by liquid according to the characteristic value of the first detection channel may include:
  determining a sum of the characteristic values of a plurality of adjacent detection channels to the first detection channel when the characteristic value of the first detection channel is greater than or equal to a second preset value;
  determining that the touch control area is covered by liquid under the condition of determining that a sum of the characteristic values is greater than or equal to a third preset value;
  wherein the second preset value is greater than the first preset value and less than the third preset value.

With the above method, the embodiment of the present disclosure can further judge whether the touch control area is covered by liquid under the condition that the characteristic value of the first detection channel is greater than the second preset value. The method is simple and the operation cost is low.

It should be noted that the present disclosure does not limit the specific size of the first preset value, the second preset value and the third preset value, and a person skilled in the art would have been able to determine same according to actual situations and requirements.

As shown in FIG. 2c, in an example, assuming that the first preset value is 3000, the second preset value is 20000 and the third preset value is 40000, then the first detection channel determined in the detection channels Ch03-Ch06 and Ch19-Ch22 is the detection channel Ch05 (the characteristic value of the detection channel Ch05 is the maximum one in the detection channels Ch03-Ch06 and Ch19-Ch22, and is greater than the first preset value); however, the characteristic value of the detection channel Ch05 is less than the second preset value (15623 is less than 20000); therefore, it can be determined that the detection channels Ch03-Ch06 and Ch19-Ch22 do not belong to the case B.

In an example, the first detection channel determined in the detection channels Ch11-Ch13 and Ch27-Ch29 is the detection channel Ch28 (the characteristic value of the detection channel Ch28 is the maximum one in the detection channels Ch11-Ch13 and Ch27-Ch29, and is greater than the first preset value), and the sum of the characteristic values (52926) of the detection channels Ch11-Ch13, Ch27, and Ch29 is greater than the third preset value (4000); therefore, it can be determined that the touch control area is covered by liquid, and the detection channels covered by water may be detection channels Ch12 and Ch28 (which can be considered as the case B in FIG. 2a, and in this case, the touch control signal detected in the touch control area can be filtered out).

Of course, if the sum of the characteristic values of the plurality of detection channels adjacent to the first detection channel is less than the third preset value, it can be judged that the touch control area is not covered by liquid.

The description above is made by taking the adjacent detection channels of the first detection channel as detection channels Ch11-Ch13, Ch27, and Ch29 as an example; however, the present disclosure is not limited thereto, and a person skilled in the art would have been able to determine that the adjacent detection channels of the first detection channel are other ones.

The case B is exemplified above, and the case A is exemplified below.

In a possible embodiment, the step S12 of determining whether the touch control area is covered by liquid according to the first detection channel may include:
  determining a first number of second detection channels in the detection channels of the touch control area under the condition that the characteristic value of the first detection channel is less than the second preset value, wherein the characteristic values of the second detection channels are greater than the first preset value;
  determining a second number of detection channels having a characteristic value greater than a fourth preset value among the plurality of detection channels adjacent to the first detection channel, the fourth preset value being greater than the first preset value;
  determining that the touch control area is covered by liquid under the condition that the first number is greater than or equal to a first number threshold value, and the second number is greater than or equal to a second number threshold value.

With the above method, the embodiment of the present disclosure can further judge whether the touch control area is covered by liquid under the condition that the characteristic value of the first detection channel is less than the second preset value. The method is simple and the operation cost is low.

It should be noted that the present disclosure does not limit the specific sizes of the fourth preset value, the first number threshold value and the second number threshold value, and a person skilled in the art would have been able to determine same according to needs.

By way of example, as shown in FIG. 2c, the first detection channel determined in the detection channels Ch03-Ch06 and Ch19-Ch22 is the detection channel Ch05, and the characteristic value of the detection channel Ch05 is 15623. At this moment, it can determine the first number of the second detection channels in the detection channels of the touch control area and the second number of detection channels having a characteristic value greater than the fourth preset value among a plurality of adjacent detection channels to the first detection channel.

In an example, the second detection channels of the detection channels of the touch control area may represent detection channels of an abnormal situation (e.g., covered by liquid) that may be different from a normal touch situation. For example, when a characteristic value of the detection channel is greater than a first preset value, the characteristic value detected in the detection channel may be considered to be an abnormal characteristic value. For example, assuming that the first preset value is 3000, according to the characteristic values of the detection channels Ch03-Ch06 and Ch19-Ch22 shown in FIG. 2c, it can be determined that the detection channels Ch03-Ch04, Ch06, and Ch19-Ch22 all comply with the definition of the second detection channels, and then the number of the second detection channels is 7.

In an example, a second number of detection channels having a characteristic value greater than a fourth preset value among a plurality of adjacent detection channels to the first detection channel may be used to represent a number of detection channels in communication with the first detection channel, and the second number threshold value may be referred to as a connected domain threshold. For example, assuming that the fourth preset value is 8000, the method of obtaining the second number may include:
  traversing from the first detection channel to the adjacent detection channels to accumulate the number of adjacent detection channels having a characteristic value greater than a fourth preset value until a detection channel having the characteristic value less than the fourth preset value is encountered.

For example, it queries and compares to the left from a detection channel Ch05 (a first detection channel), and a second number is set to 1 as a characteristic value of the detection channel Ch05 is greater than a fourth preset value (8000). It continues to query and compare to the left, and the second number is incremented by 1 and set to 2, as a characteristic value of the detection channel Ch03 is greater than the fourth preset value. It continues to query and compare to the left; as a characteristic value of the detection channel Ch02 is less than a fourth preset value, it stops querying and comparing to the left. It queries and compares to the right from the detection channel Ch05, and determines that the characteristic value of the detection channel Ch06 is less than the fourth preset value; thus, it stops querying and comparing to the right, and keeps the second number as 2 . . . . It repeats the above process, and the second number can be determined to be 4.

Assuming that the first number threshold value is 6 and the second number threshold value is 2, according to "determining that the touch control area is covered by liquid under the condition that the first number is greater than or equal to a first number threshold value and the second number is greater than or equal to a second number threshold value", it can be determined that the touch control area is covered by liquid, and the detection channels covered by liquid may include detection channels Ch03-Ch04, Ch06, and Ch19-Ch22 (which can be considered as the case A in FIG. 2a, where the touch control signal detected in the touch control area can be filtered out).

Figure 3:
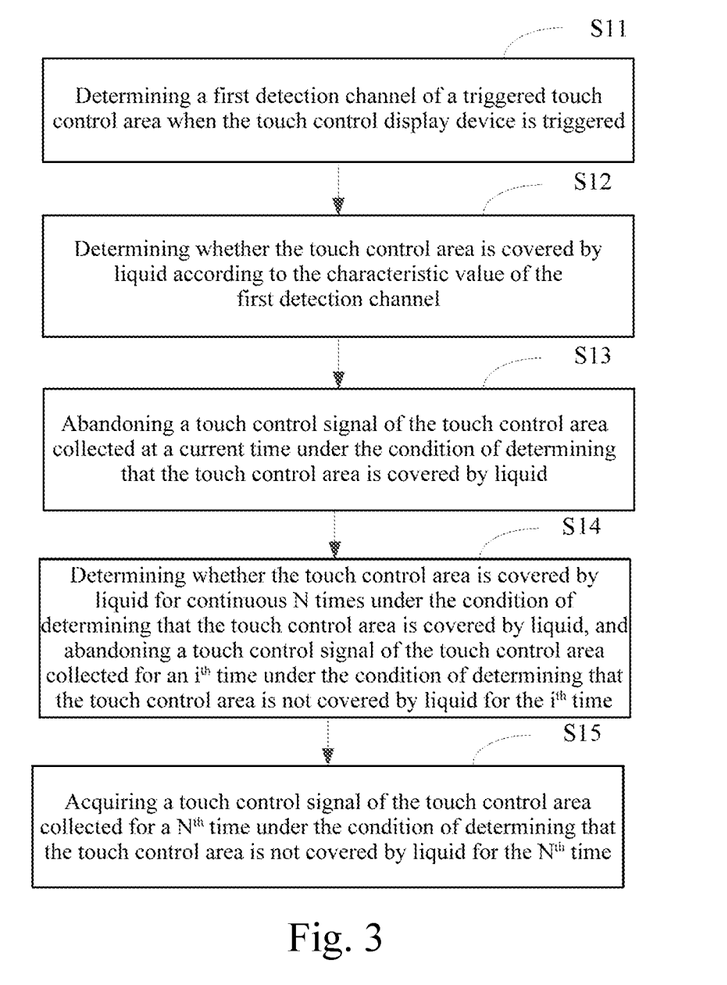
FIG. 3 shows a flow chart of a detection method according to an embodiment of the present disclosure.

Referring to FIG. 3, it shows a flow chart of a detection method according to an embodiment of the present disclosure.

In a possible embodiment, as shown in FIG. 3, the method may further include:

Step S14, determining whether the touch control area is covered by liquid for continuous N times under the condition of determining that the touch control area is covered by liquid, and not responding to a touch control signal of the touch control area acquired for an $i^{th}$ time under the condition of determining that the touch control area is not covered by liquid for the $i^{th}$ time, where 1≤i≤N−1, and i and N are integers;

Step S15, acquiring a touch control signal of the touch control area collected for a $N^{th}$ time under the condition of determining that the touch control area is not covered by liquid for the $N^{th}$ time.

With the above method, the present disclosure introduces an anti-shaking mechanism, and determines whether the touch control area is covered by liquid for continuous N times under the condition of determining that the touch control area is covered by liquid, and not responding to a touch control signal of the touch control area acquired for an $i^{th}$ time under the condition of determining that the touch control area is not covered by liquid for the $i^{th}$ time, so as to avoid collecting an erroneous and distorted signal in touch control signal collection. When it is determined that the touch control area is not covered by liquid for continuous N−1 times, it can be determined that liquid has been wiped dry, and the touch control area has been unaffected by liquid and in normal working state, therefore, the touch control signal collected at the $N^{th}$ time can be acquired.

It should be noted that in the embodiments of the present disclosure, "time(s)" (e.g., the $i^{th}$ time, continuous N times, for the current time, etc.) is used to describe the manner of determining whether a touch control area is covered by liquid, and other expressions are also possible. For example, determining a touch control area "once" (for one time) may refer to one touch control scanning frame obtained by performing touch control scanning on a touch control display device. It should be noted that the present disclosure does not limit the specific number of times in determining whether the touch control area is covered by liquid for continuous N times in the anti-shaking mechanism, and a person skilled in the art would be able to determine the same as needed.

The anti-shaking mechanism shown in FIG. 3 is exemplarily described below.

Figure 4:
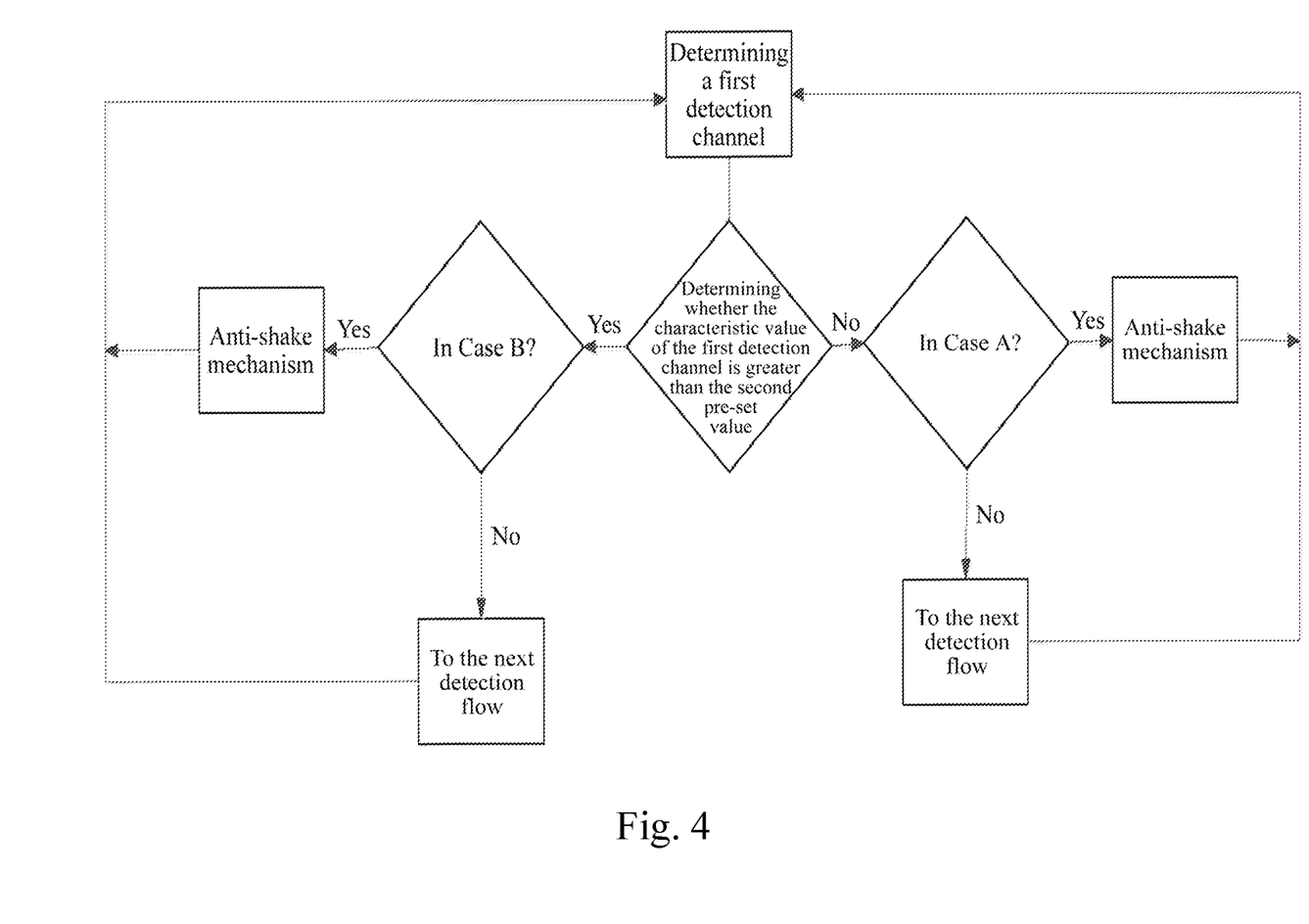
FIG. 4 shows a schematic diagram of a detection method according to an embodiment of the present disclosure.

Referring to FIG. 4, it shows a schematic diagram of a detection method according to an embodiment of the present disclosure.

As shown in FIG. 4, after the first detection channel is determined, it is judged whether the characteristic value of the first detection channel is greater than a second preset value. When the characteristic value of the first detection channel is greater than the second preset value, it is further judged whether it is the case B shown in FIG. 2a (reference can be made to the previous description for the specific judgement method, and the description thereof will not be repeated here). When determining that the current touch control area is covered by water and is the case B, it can be determined whether the touch control area is covered by liquid for continuous N times by means of the anti-shaking mechanism shown in FIG. 3, and not respond to a touch control signal of the touch control area acquired for an $i^{th}$ time under the condition of determining that the touch control area is not covered by liquid for the $i^{th}$ time, and acquire a touch control signal of the touch control area collected for a $N^{th}$ time under the condition of determining that the touch control area is not covered by liquid for the $N^{th}$ time. When determining whether the touch control area is the case B, if it is determined that the case B is not satisfied (the sum of characteristic values of a plurality of adjacent detection channels of the first detection channel is less than the third preset value), it is determined that the touch control area is not covered by liquid and it directly moves to the next detection flow (collecting the next touch control scanning frame).

As shown in FIG. 4, after the first detection channel is determined, it is judged whether the characteristic value of the first detection channel is greater than a second preset value. When the characteristic value of the first detection channel is less than the second preset value, it is further judged whether it is the case A shown in FIG. 2a (reference can be made to the previous description for the specific judgement method, and the description thereof will not be repeated here). When determining that the current touch control area is covered by water and is the case A, it can be determined whether the touch control area is covered by liquid for continuous N times via the anti-shaking mechanism shown in FIG. 3, and respond to a touch control signal of the touch control area acquired for an $i^{th}$ time under the condition of determining that the touch control area is not covered by liquid for the $i^{th}$ time, and acquire a touch control signal of the touch control area collected for a $N^{th}$ time under the condition of determining that the touch control area is not covered by liquid for the $N^{th}$ time. When determining whether the touch control area is the case A, if it is determined that the case A is not satisfied (under the condition that the first number is less than a first number threshold value and/or the second number is less than a second number threshold value), it is determined that the touch control area is not covered by liquid and it directly moves to the next detection flow (collecting a next touch control scanning frame). Of course, the above description is exemplary rather than limiting on the present disclosure.

Figure 5:
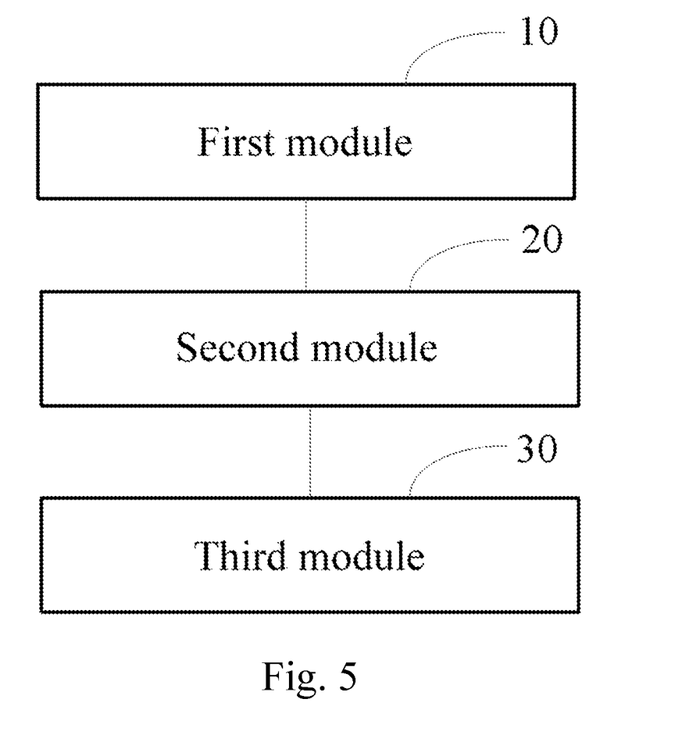
FIG. 5 shows a schematic diagram of a detection device according to an embodiment of the present disclosure.

Referring to FIG. 5, it shows a schematic diagram of a detection device according to an embodiment of the present disclosure.

As shown in FIG. 5, the device includes:

a first module 10 configured for determining a first detection channel of a triggered touch control area when a touch control display device is triggered, where the touch control display device includes a plurality of detection channels used for obtaining characteristic values according to a touch action, the characteristic value of the first detection channel is greater than a first preset value, and the characteristic value of the first detection channel is a maximum value of the characteristic values of the plurality of detection channels;

a second module 20 connected to the first module 10 and configured for determining whether the touch control area is covered by liquid according to the characteristic value of the first detection channel; and a third module 30 connected to the second module 20 and configured for not responding to a touch control signal of the touch control area collected at a current time under the condition of determining that the touch control area is covered by liquid.

With the above device, the embodiments of the present disclosure may determine a first detection channel of a triggered touch control area when a touch control display device is triggered; determine whether the touch control area is covered by liquid according to a characteristic value of a first detection channel; and not respond to a touch control signal of the touch control area collected at a current time under the condition of determining that the touch control area is covered by liquid. The detection device proposed in the embodiments of the present disclosure can quickly and accurately determine whether the triggered touch control area is covered by liquid, so as to avoid collecting a distorted and erroneous touch control signal. The detection method of the embodiments of the present disclosure is relatively simple and has low operation cost.

In a possible embodiment, determining whether the touch control area is covered by liquid according to the characteristic value of the first detection channel includes:
determining a sum of the characteristic values of a plurality of adjacent detection channels to the first detection channel when the characteristic value of the first detection channel is greater than or equal to a second preset value;
determining that the touch control area is covered by liquid under the condition of determining that a sum of the characteristic values is greater than or equal to a third preset value;
wherein the second preset value is greater than the first preset value and less than the third preset value.

In a possible embodiment, determining whether the touch control area is covered by liquid according to the first detection channel includes:
determining a first number of second detection channels in the detection channel of the touch control area under the condition that the characteristic value of the first detection channel is less than the second preset value, wherein the characteristic value of the second detection channel is greater than the first preset value;
determining a second number of detection channels having a characteristic value greater than a fourth preset value among a plurality of adjacent detection channels to the first detection channel, the fourth preset value being greater than the first preset value;
determining that the touch control area is covered by liquid under the condition that the first number is greater than or equal to a first number threshold value, and the second number is greater than or equal to a second number threshold value.

In a possible embodiment, the device may further include:
a fourth module connected to the second module and configured for determining whether the touch control area is covered by liquid tier continuous N times under the condition of determining that the touch control area is covered by liquid, and not responding to a touch control signal of the touch control area acquired for an $i^{th}$ time under the condition of determining that the touch control area is not covered by liquid for the $i^{th}$ time, wherein $1 \leq i \leq N-1$, and i and N are integers;
wherein the third module is further configured for acquiring a touch control signal of the touch control area collected for a $N^{th}$ time under the condition of determining that the touch control area is not covered by liquid for the $N^{th}$ time.

It should be noted that the detection device is a device corresponding to the aforementioned detection method, and the detailed description thereof refers to the previous description of the method, which will not be repeated here.

Figure 6:
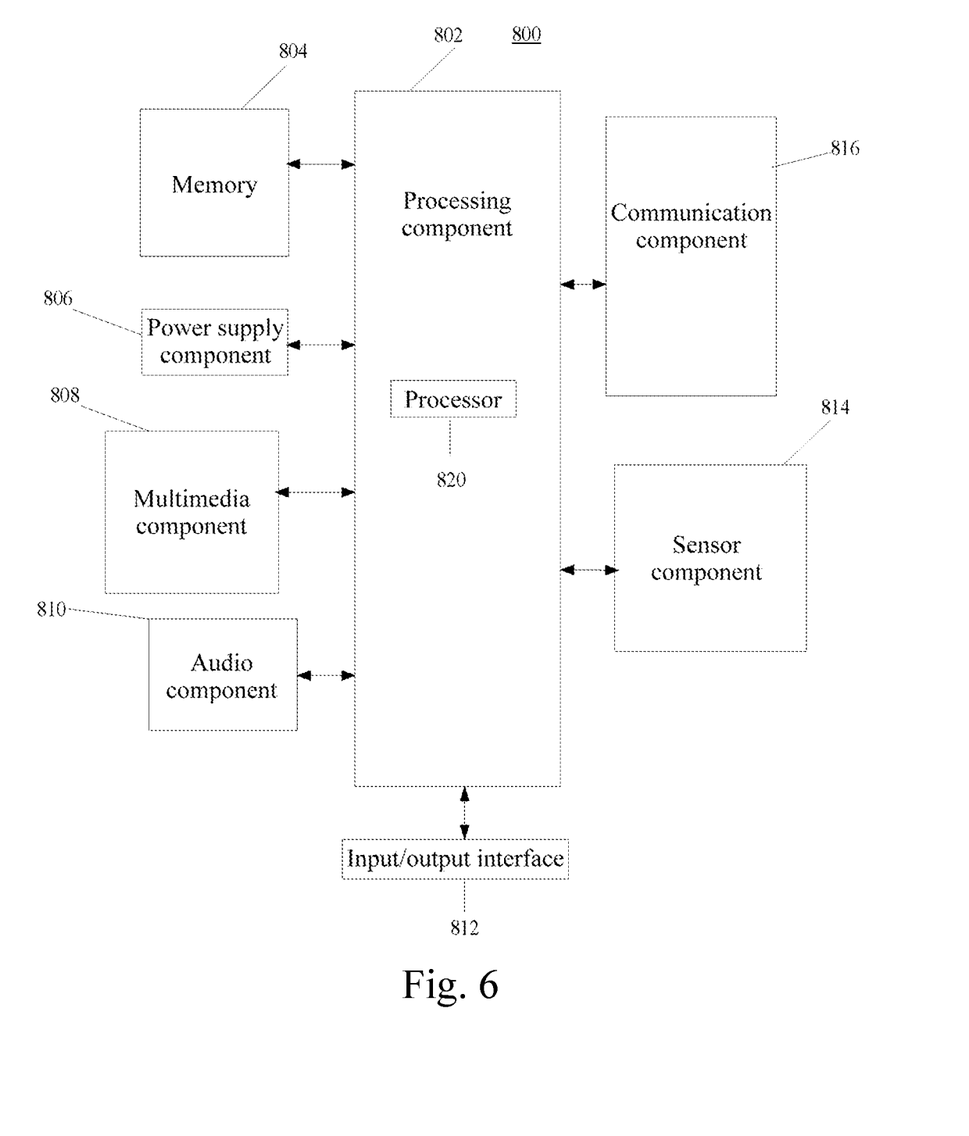
FIG. 6 shows a block diagram of a mobile equipment according to an embodiment of the present disclosure.

FIG. 6 shows a block diagram of a mobile equipment 800 according to an embodiment of the present disclosure. For example, the device 800 may be a mobile phone, a computer, a digital broadcast mobile equipment, a messaging device, a game console, a tablet device, a medical device, an exercise device, a personal digital assistant, etc.

Referring to FIG. 6, the mobile equipment 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operation of the mobile equipment 800, such as operations associated with displaying, telephone calls, data communications, camera operations, and recording operations. The processing component 802 can include one or more processors 820 to execute instructions to perform all or part of the steps of the methods described above. In addition, the processing component 802 can include one or more modules to facilitate interaction between the processing component 802 and other components. For example, the processing component 802 can include a multimedia module to facilitate interaction between the multimedia component 808 and the processing component 802.

The memory 804 is configured to store various types of data to support operation at the mobile equipment 800. Examples of such data include instructions for any application or method, contact data, phonebook data, messages, pictures, videos, etc. operating on the mobile equipment 800. The memory 804 may be implemented by any type or combination of volatile or non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 provides power to various components of the mobile equipment 800. The power supply component 806 can include a power management system, one or more power sources, and other components associated with generating, managing, and distributing power for the device 800.

The multimedia component 808 includes a screen that provides an output interface between the mobile equipment 800 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of a touch or slide action, but also detect the duration and pressure associated with the touch or slide operation. In some embodiments, the multimedia component 808 includes a front camera and/or a rear camera. The front camera and/or rear camera can receive external multimedia data when the device 800 is in an operation mode, such as a shooting mode or a video mode. Each of the front camera and the rear camera may be a fixed optical lens system or have a focal length and an optical zoom capability.

The audio component 810 is configured to output and/or input audio signals. For example, the audio component 810 includes a microphone (MIC) configured to receive external audio signals when the device 800 is in an operation mode, such as a call mode, a recording mode, and a voice recognition mode. The received audio signals may be further stored in the memory 804 or transmitted via the communication component 816. In some embodiments, the audio component 810 also includes a speaker for outputting audio signals.

The I/O interface 812 provides an interface between the processing component 802 and a peripheral interface module, which may be a keyboard, a click wheel, a button, etc. These buttons may include, but are not limited to, a home button, a volume button, a start button and a lock button.

The sensor component 814 includes one or more sensors for providing status assessments for various aspects of the mobile equipment 800. For example, the sensor component 814 can detect an on/off state of the mobile equipment 800, and relative positioning of components, such as a display and keypad of the device 800; and the sensor component 814 can also detect a change in position of the mobile equipment 800 or a component of the mobile equipment 800, the presence or absence of user contact with the mobile equipment 800, an orientation or acceleration/deceleration of the mobile equipment 800, and a change in temperature of the mobile equipment 800. The sensor component 814 may include a proximity sensor configured to detect the presence of a nearby object in the absence of any physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the mobile equipment 800 and other equipment. The mobile equipment 800 may access a wireless network based on a communication standard, such as WiFi, 2G, or 3G, or a combination thereof. In one exemplary embodiment, the communication component 816 receives broadcast signals or broadcast related information from an external broadcast management system via a broadcast channel. In one exemplary embodiment, the communication component 816 further includes a near field communication (NFC) module to facilitate short range communication. For example, the NFC module may be implemented based on RFID technology, IrDA technology, UWB technology, BLUETOOTH® (BT) technology, and other technologies.

In an exemplary embodiment, the mobile equipment 800 may be implemented with one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements for performing the methods described above.

In an exemplary embodiment, a non-volatile computer-readable storage medium is also provided, such as memory 804 including computer program instructions executable by a processor 820 of the mobile equipment 800 to perform the methods described above.

Various embodiments of the present disclosure have been described above. The foregoing description is exemplary, not exhaustive, and not limited to the disclosed embodiments. Many modifications and variations will be apparent to those of ordinary skill in the art without departing from the scope and spirit of the embodiments described. The terminology used herein is chosen in order to best explain the principles of the embodiments, practical applications, or adaptations of the technology in the marketplace or to enable others of ordinary skill in the art to understand the embodiments disclosed herein.

What is claimed is:

1. A detection method, wherein the method comprises:
   determining a first detection channel of a touch control area when a touch control display device is triggered, wherein the touch control display device includes a plurality of detection channels including the first detection channel for obtaining characteristic values based on a touch action, the characteristic value of the first detection channel is greater than a first preset value, and the characteristic value of the first detection channel is a maximum value among the characteristic values of the plurality of detection channels;
   determining whether the touch control area is covered by liquid based on the characteristic value of the first detection channel, wherein determining whether the touch control area is covered by liquid based on the characteristic value of the first detection channel comprises:
      determining a sum of the characteristic values of a plurality of adjacent detection channels to the first detection channel responsive to the characteristic value of the first detection channel is greater than or equal to a second preset value; and
      responsive to determining that the sum of the characteristic values is greater than or equal to a third preset value, determining that the touch control area is covered by liquid,
      wherein the second preset value is greater than the first preset value and less than the third preset value; and
   responsive to determining that the touch control area is covered by liquid for a current time, not responding to a touch control signal of the touch control area collected for the current time.

2. The method according to claim 1, wherein determining whether the touch control area is covered by liquid based on the first detection channel comprises:
   responsive to the characteristic value of the first detection channel is less than the second preset value, determining a first number of second detection channels in the plurality of detection channels of the touch control area, wherein the characteristic value of each of the first number of the second detection channels is greater than the first preset value;
   determining a second number of detection channels having a characteristic value greater than a fourth preset value among the plurality of adjacent detection channels to the first detection channel, the fourth preset value being greater than the first preset value; and
   responsive to the first number is greater than or equal to a first number threshold value and the second number is greater than or equal to a second number threshold value, determining that the touch control area is covered by liquid.

3. The method according to claim 1, wherein the method further comprises:
   responsive to determining that the touch control area is covered by liquid, determining for continuous N times, whether the touch control area is covered by liquid;
   responsive to determining that the touch control area is not covered by liquid for an $i^{th}$ time, not responding to the touch control signal of the touch control area acquired for the $i^{th}$ time, wherein $1 \leq i \leq N-1$, wherein i and N are integers; and
   responsive to determining that the touch control area is not covered by liquid for an $N^{th}$ time, acquiring the touch control signal of the touch control area acquired for the $N^{th}$ time.

4. The method according to claim 1, wherein the detection channels comprise triangular sensors.

5. A device, wherein the device comprises one or more processors coupled with one or more non-volatile computer-readable storage media that include computer program instructions executable by the one or more processors to perform operations comprising:
  determining a first detection channel of a touch control area when a touch control display device is triggered, wherein the touch control display device includes a plurality of detection channels including the first detection channel for obtaining characteristic values based on a touch action, the characteristic value of the first detection channel is greater than a first preset value, and the characteristic value of the first detection channel is a maximum value among the characteristic values of the plurality of detection channels;
  determining whether the touch control area is covered by liquid based on the characteristic value of the first detection channel, wherein determining whether the touch control area is covered by liquid based on the characteristic value of the first detection channel comprises:
    determining a sum of the characteristic values of a plurality of adjacent detection channels to the first detection channel responsive to the characteristic value of the first detection channel is greater than or equal to a second preset value; and
    responsive to determining that the sum of the characteristic values is greater than or equal to a third preset value, determining that the touch control area is covered by liquid,
    wherein the second preset value is greater than the first preset value and less than the third preset value; and
  responsive to determining that the touch control area is covered by liquid for a current time, not responding to a touch control signal of the touch control area collected for the current time.

6. The device according to claim 5, wherein determining whether the touch control area is covered by liquid based on the first detection channel comprises:
  responsive to the characteristic value of the first detection channel is less than the second preset value, determining a first number of second detection channels in the plurality of detection channels of the touch control area, wherein the characteristic value of each of the first number of the second detection channels is greater than the first preset value;
  determining a second number of detection channels having a characteristic value greater than a fourth preset value among the plurality of adjacent detection channels to the first detection channel, the fourth preset value being greater than the first preset value; and
  responsive to the first number is greater than or equal to a first number threshold value and the second number is greater than or equal to a second number threshold value, determining that the touch control area is covered by liquid.

7. The device according to claim 5, wherein the operations further comprise:
  responsive to determining that the touch control area is covered by liquid, determining, for continuous N times, whether the touch control area is covered by liquid,
  responsive to determining that the touch control area is not covered by liquid for an $i^{th}$ time, not responding to the touch control signal of the touch control area acquired for the $i^{th}$ time, wherein $1 \leq i \leq N-1$, and i and N are integers; and
  responsive to determining that the touch control area is not covered by liquid for a $N^{th}$ time, acquiring the touch control signal of the touch control area collected for the $N^{th}$ time.

8. An electronic equipment, wherein the electronic equipment comprises:
  a detection device comprising one or more processors coupled with one or more non-volatile computer-readable storage media that include computer program instructions executable by the one or more processors to perform operations comprising:
    determining a first detection channel of a touch control area when a touch control display device is triggered, wherein the touch control display device includes a plurality of detection channels including the first detection channel for obtaining characteristic values based on a touch action, the characteristic value of the first detection channel is greater than a first preset value, and the characteristic value of the first detection channel is a maximum value among the characteristic values of the plurality of detection channels,
  determining whether the touch control area is covered by liquid based on the characteristic value of the first detection channel, wherein determining whether the touch control area is covered by liquid based on the characteristic value of the first detection channel comprises:
    determining a sum of the characteristic values of a plurality of adjacent detection channels to the first detection channel responsive to the characteristic value of the first detection channel is greater than or equal to a second preset value; and
    responsive to determining that the sum of the characteristic values is greater than or equal to a third preset value, determining that the touch control area is covered by liquid,
    wherein the second preset value is greater than the first preset value and less than the third preset value; and
    responsive to determining that the touch control area is covered by liquid for a current time, not responding to a touch control signal of the touch control area collected for the current time; and
  a display panel.

9. The electronic equipment according to claim 8, wherein determining whether the touch control area is covered by liquid based on the first detection channel comprises:
  responsive to the characteristic value of the first detection channel is less than the second preset value, determining a first number of second detection channels in the plurality of detection channels of the touch control area, wherein the characteristic value of each of the first number of the second detection channels is greater than the first preset value;
  determining a second number of detection channels having a characteristic value greater than a fourth preset value among the plurality of adjacent detection channels to the first detection channel, the fourth preset value being greater than the first preset value; and
  responsive to the first number is greater than or equal to a first number threshold value and the second number is greater than or equal to a second number threshold value, determining that the touch control area is covered by liquid.

10. The electronic equipment according to claim 8, wherein the operations further comprise:
- responsive to determining, for continuous N times, whether the touch control area is covered by liquid, determining whether the touch control area is covered by liquid;
- responsive to determining that the touch control area is not covered by liquid for an $i^{th}$ time, not responding to the touch control signal of the touch control area acquired for the $i^{th}$ time, wherein $1 \leq i \leq N-1$, and i and N are integers; and
- responsive to determining that the touch control area is not covered by liquid for a $N^{th}$ time, acquiring the touch control signal of the touch control area collected for the $N^{th}$ time.

11. The electronic equipment according to claim 8, wherein the display panel comprises at least one of a liquid crystal display component, a light emitting diode display component, an organic light emitting diode display component, or a micro light emitting diode display component.

* * * * *